Sept. 4, 1956 F. H. MARTIN 2,761,422
FLOATING FEEDING DEVICE FOR AQUARIUMS
Filed July 13, 1954
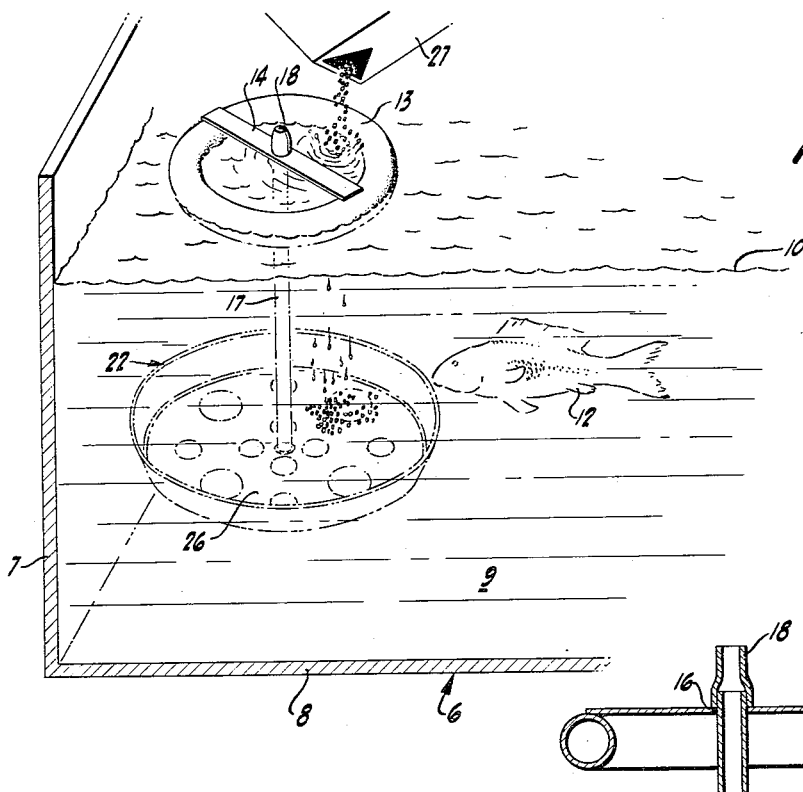
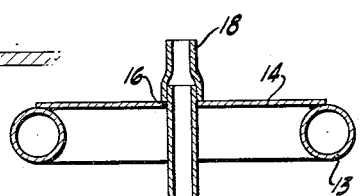
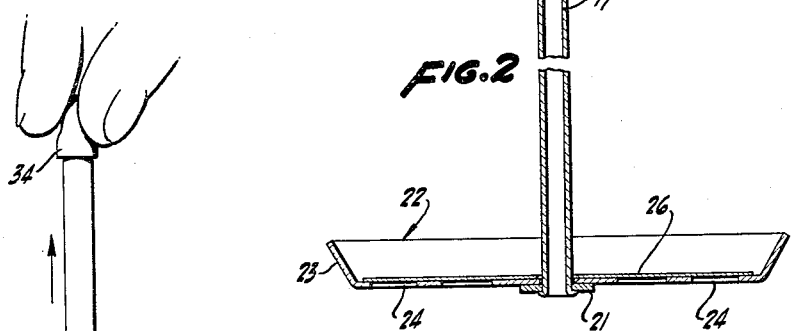
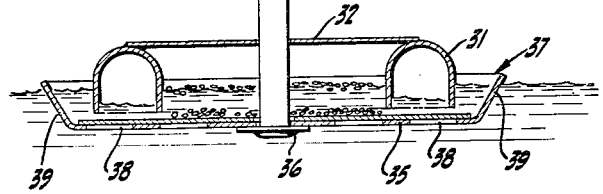
INVENTOR.
FRANK H. MARTIN
BY
ATTORNEY United States Patent Office 2,761,422
Patented Sept. 4, 1956

2,761,422

FLOATING FEEDING DEVICE FOR AQUARIUMS

Frank H. Martin, San Francisco, Calif.

Application July 13, 1954, Serial No. 442,972

5 Claims. (Cl. 119—5)

Many people, for pleasure or otherwise, maintain fish ponds or aquariums for the purpose of nurturing and cultivating the growth of fish and comparable aquatic dwellers. It is customary and often necessary to supply food of a certain nature to the aquarium. It is one of the difficulties in such an operation that sometimes excess food not consumed by the fish or other aquarium dwellers accumulates within the tank or aquarium and eventually spoils so as to render the surroundings unfit for appropriate use. This accumulation of extra food and comparable debris often requires difficult steps to remedy or obviate.

It is therefore an object of my invention to provide an aquarium appliance which assists in providing appropriate feeding for the denizens of the aquarium and simultaneously precludes miscellaneous dispersion of the unconsumed food.

A further object of my invention is to provide an aquarium appliance so that excess food provided can be removed without substantial difficulty.

Another object of my invention is to provide an aquarium appliance which is relatively light, simple and cheap so that it can be utilized for an extended period and can be replaced eventually without substantial loss, if desired.

A still further object of my invention is to provide an aquarium apparatus in which various attendant mechanisms can be utilized so that the interior of the aquarium is maintained in a neat and effective fashion.

Other objects of the invention, together with the foregoing, are attained in the forms of the invention described in the accompanying description and illustrated in the accompanying drawings, in which:

Figure 1 is a view in isometric projection showing, partly in cross-section, an aquarium appliance in place and in use in an aquarium.

Figure 2 is an enlarged cross-section on a diametrical, vertical plane through the form of aquarium appliance as shown in Figure 1.

Figure 3 is a view comparable to Figure 2 but showing a modified form of aquarium appliance in accordance with my invention.

While the aquarium appliance in accordance with my invention can be fabricated in a large number of different ways, depending upon the environment for which it is especially designed and depending upon many other factors, it has quite successfully been incorporated in the form shown in Figure 1.

The device is intended for use in an aquarium 6 including a tank having an end wall 7, a bottom wall 8 and comparable other enclosing walls to confine a body 9 of water at an approximate level 10 to accommodate a fish 12 or other aquatic dweller.

In carrying out the invention I provide a buoyant ring 13, or hollow annulus, preferably constructed of a light impervious plastic so that the ring 13 not only floats on the surface 10 of the water but has a substantial capacity to bear weight. Spanning the ring 13 is a diametrical strap 14 likewise preferably of plastic and secured in place on the ring to serve as a reasonably stiff yet light beam. The strap 14, adjacent the center, is pierced to provide an opening 16 through which extends a central stem 17, conveniently a tube at one end carrying a collar 18 united therewith and abutting the upper face of the strap 14 adjacent the opening 16 so that the stem 17 depends centrally from the ring 13. The stem 17 can be lifted through the opening 16 since it has an easy sliding fit therewith but displacement of the stem 17 toward the tank bottom is limited.

Adjacent its other, lower end, the stem 17 is provided with a bead to hold in place a washer 21 supporting a food tray 22. This tray is preferably a generally planar, circular plastic sheet having a diameter at least as great and preferably slightly greater than the outside diameter of the ring 13. The food tray 22 is, around its edges, turned up to provide a flanged margin 23 and throughout its planar portion is provided with a plurality of perforations or openings 24. The food tray 22 is freely slidable along the stem 17 and normally rests at the lower end against the washer 21. The bottom of the food tray is designed to be covered with a disk 26 or strainer pad pervious to water but impervious to the usual food supply.

In use, the appliance is simply introduced into the tank 6 and floats, as shown in Figure 1, with the supernatant and buoyant ring 13 supporting the food tray at a convenient distance below the water level 10. In feeding, the customary food is deposited from the usual package 27 into the water 9 but only within the confines of the ring 13. This keeps the food from dispersing along the surface of the water. Food floating on the surface is confined within the ring and falling food is confined to a substantially vertical column immediately below the interior diameter of the ring 13. The food thus is restricted and does not spread about over the interior of the tank. Falling food eventually falls onto the food tray 22 and deposits on the strainer pad 26. The fish 12 is enabled to consume the food as it floats at the surface, as it falls toward the food tray or after it lies upon such tray. Since the food tray is slightly larger in diameter than the interior of the ring 13, any moderate vagrancy of motion of the falling food is nevertheless within the confines of the tray.

For subsequent cleaning it is merely necessary to remove the appliance and change the strainer pad 26. The user readily accomplishes this by grasping and lifting the collar 18. This lifts the stem 17 and thus lifts the tray to a convenient height for inspection. As the tray is lifted substantially straight up, it sweeps the suspended food onto the strainer pad and finally lifts the floating food from the water surface. Because of the perforations 24, there is adequate water circulation through, around and about the food and the movement of the device into the water and out of the water is easily accomplished.

Eventually, when the appliance is removed for cleaning it can be readily sterilized and washed, the strainer pad can be changed, and it can easily be returned for further use.

As a modification, there is disclosed in Figure 3 an apparatus for the same general purpose but having a somewhat different construction. In this instance, there is likewise provided a buoyant member 31 but for ease in manufacture the member or ring is not circular in cross-section but is an inverted U acting as a bell and so being buoyant. The member 31 has a diametrical strap 32 supporting a central stem 33. The stem, at its upper end has a grasping terminal 34 and adjacent its lower end has an enlargement 36 in engagement with a cup 37 having a flat or planar bottom 35 pierced by perforations 38. The outside wall 39 has an outward flare providing a conical flange.

The operation and use of this device is substantially the same as previously described but the manufacture is somewhat easier since the buoyant ring 31 is easily molded.

In both forms of the invention disclosed herein there is afforded an aquarium appliance effective to provide suitable and adequate feeding facilities for the inhabitants of the aquarium and especially one which confines the feeding zone to a prescribed area, one which permits ready removal of surplus food, and one which assists in maintaining the sanitation of the dwelling place.

What is claimed is:

1. An aquarium appliance comprising a buoyant ring, a central depending stem, means for supporting said stem from said ring, a perforate food tray connected to said stem below said ring, and a water pervious sheet on and substantially coextensive with said tray.

2. An aquarium appliance comprising a buoyant ring, a central stem, means for slidably connecting said stem adjacent one end to said ring, a food tray, means for connecting said stem adjacent the other end to said food tray, and a stop on said stem for preventing excess separating movement of said ring and said tray.

3. An aquarium appliance comprising a buoyant ring having a central opening, a diametrical strap spanning said ring and leaving portions of said opening unobstructed, a tube at one end connected to the center of said strap and depending therefrom, and a circular food tray at its center connected to the other end of said tube and underlying said unobstructed portions.

4. An aquarium appliance comprising a buoyant ring, a diametrical strap spanning said ring and having a central opening, a central stem extending freely through said opening and depending from said strap, a collar fixed on the upper end of said stem in weight-supporting engagement with said strap above said opening, and a food tray at its center connected to the lower end of said stem.

5. An aquarium appliance comprising a buoyant ring having a central opening, a diametrical strap spanning said ring and leaving portions of said opening unobstructed, said strap having a central opening, a central stem passing through said opening and slidably engaging said strap, a stop collar on said stem above and in weight-supporting abutment with said strap, a food tray on said stem below said unobstructed portions, and means on said stem below said tray for transmitting the weight of said tray to said stem.

References Cited in the file of this patent

UNITED STATES PATENTS

| | | |
|---|---|---|
| 1,976,962 | Pape | Oct. 16, 1934 |
| 2,583,911 | Webster | Jan. 29, 1952 |
| 2,711,714 | Timeus | June 28, 1955 |
| 2,718,211 | Pettas | Sept. 20, 1955 |

FOREIGN PATENTS

| | | |
|---|---|---|
| 143,395 | Germany | Aug. 15, 1903 |